Patented Jan. 14, 1930

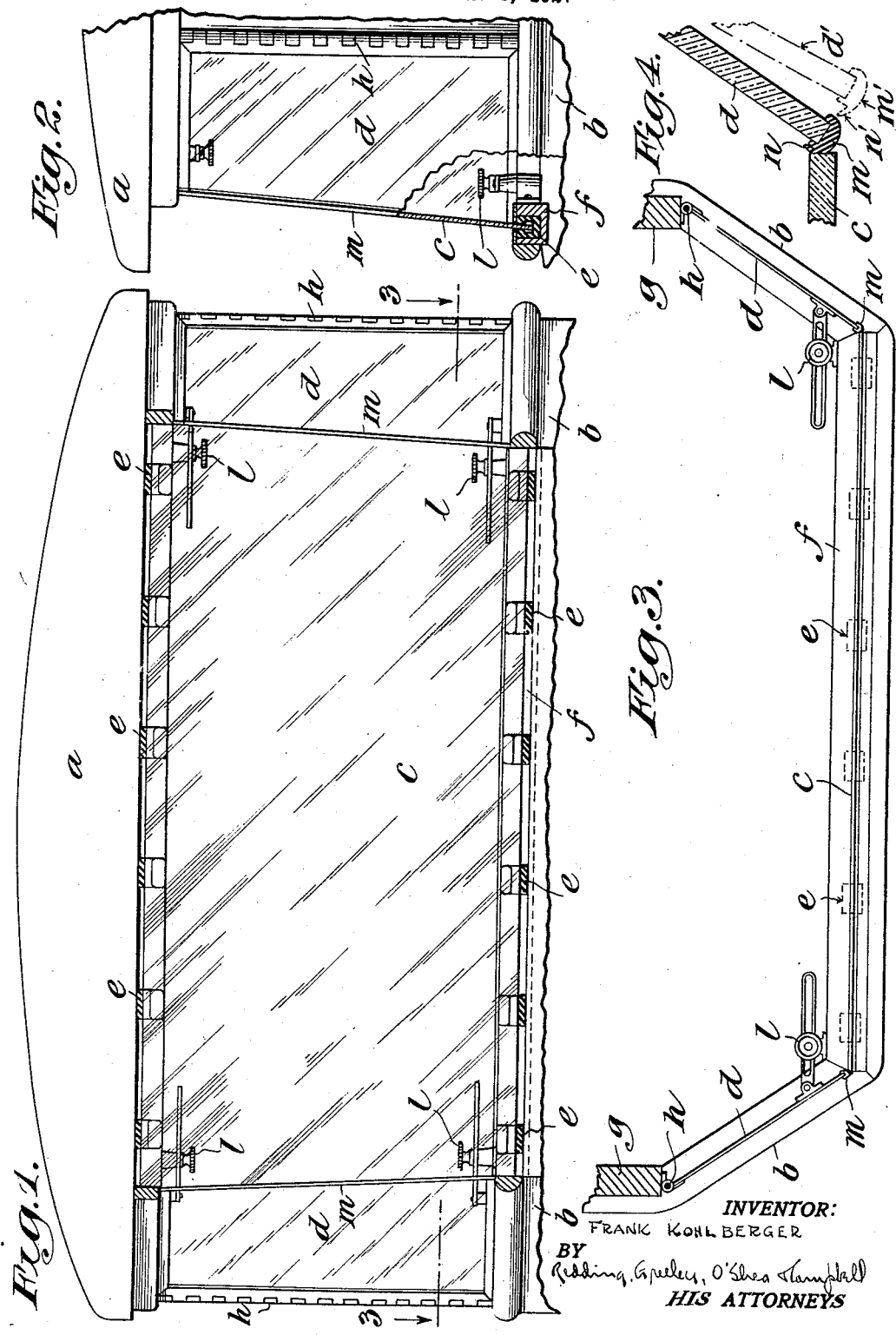

1,743,147

UNITED STATES PATENT OFFICE

FRANK KOHLBERGER, OF WHITESTONE, NEW YORK, ASSIGNOR TO INTERNATIONAL MOTOR COMPANY, OF NEW YORK, N. Y., A CORPORATION OF DELAWARE

FULL-VISION WINDSHIELD

Application filed January 4, 1927. Serial No. 158,850.

This invention relates to windshields for vehicles, and particularly to those adapted for use in buses, but its applicability is not to be deemed limited to such use.

One of the principal objects of the invention is to provide a windshield which will give the driver an unobstructed view of the roadway.

Another object is to provide a windshield in which the customary side post ordinarily provided to mount the windshield may be eliminated.

Still another object is to so mount the windshield as to prevent the glare of the sun or of the headlights of approaching vehicles or vehicles in the rear from being reflected into the eyes of the driver.

A further object consists in so mounting the windshield as to reduce to a minimum the possibility of breakage or fracture.

Other objects and advantages will appear more fully in the following detailed description taken in connection with the appended drawings, in which:

Figure 1 is a front view in elevation of a vehicle to which the windshield according to the invention has been applied.

Figure 2 is a side view in elevation of a portion of the vehicle shown in Figure 1 and showing, in section, the manner of mounting the rubber blocks.

Figure 3 is a transverse horizontal section of the windshield shown in Figures 1 and 2 and taken on a plane indicated by the line 3—3 in Figure 1.

Figure 4 is an enlarged view of a corner of the front and side pieces of the windshield showing the manner of making the closure weather-proof.

There is shown in Figures 1 and 2 a portion of the front of a vehicle body having a top $a$ and cowl $b$ between which is mounted a windshield $c$. It is intended that the windshield be so mounted as to have no capacity for relative movement with respect to the body as in the ordinary mounting wherein the windshield is designed to swing upwardly and outwardly about a hinged or pivoted joint carried in the upright posts at either end of the windshield. Hence, the upright posts upon which the ordinary windshield is hung are eliminated and the windshield according to the present invention is immovably mounted in rubber blocks $e$ or other suitable non-metallic material carried in channels $f$ formed in the top $a$ and cowl $b$ of the vehicle. The windshield $c$ may be slightly inclined forwardly and downwardly as indicated in Figure 2 so that the glare from the sun or other light sources is not reflected into the eyes of the driver.

To provide means for ventilation and to increase the field of vision, side windows $d$ are provided extending from the edges of the windshield $c$ to the side posts $g$ of the vehicle body. The windows $d$ are hinged to the side posts $g$ as by the hinges $h$ so that they may be swung outwardly. They may be maintained in any desired position, either closed or opened, by the adjustable window locks $l$.

In order to provide a weather-proof closure between the edge of the windshield $c$ and the window $d$ a strip of rubber or other suitable non-metallic material $m$ is fitted upon the edge of the window. This strip is formed with a flexible lip $n'$ which folds over, as shown at $n$, when the window is closed thus insuring a perfect closure.

It will thus be seen that the windshield herein described permits a much greater field of vision than the type in which a post of necessarily considerable thickness is provided adjacent the edges of the windshield. In the present invention the only obstruction to an absolutely unobstructed field of vision is the strip $m$ and this is of such relatively negligible dimensions that it forms almost no obstruction from a practical standpoint. It will be noted, also, that when the windows $d$ are opened there is absolutely no obstruction to the field of vision whereas in the old construction the side posts are fixed and remain to obstruct the view whether the windshield be opened or closed.

It has been found in actual practice that with the unique non-metallic mounting set forth herein that the danger of breakage or fracture of the windshield is reduced to a minimum. In fact, in a known case, where the top of the vehicle body had been cracked in two the windshield remained intact. The advantages of the present mounting are therefore obvious.

Nothing that has been said in the preceding description is to be construed as a limitation upon the scope of the invention except as indicated in the appended claim.

What I claim is:

In a motor vehicle having a cowl, a top, and posts to support the top, a windshield comprising, in combination, a transverse center portion forward of the foremost posts and having its upper and lower edges fixedly mounted in the top and cowl, respectively, but having its side edges free, and side portions each having one edge hinged to the foremost post on its side of the vehicle to swing forwardly and outwardly about said post and a second edge adapted to abut against one of the free edges of the front portion to form a closure.

This specification signed this 28th day of December, A. D. 1926.

FRANK KOHLBERGER.